UNITED STATES PATENT OFFICE.

JOHNN WITTLIFF, OF MINNEAPOLIS, MINNESOTA.

CORE.

No. 915,817.  Specification of Letters Patent.  Patented March 23, 1909.

Application filed December 17, 1908. Serial No. 468,065.

To all whom it may concern:

Be it known that I, JOHNN WITTLIFF, a citizen of the United States, residing at Minneapolis, in the county of Hennepin and State of Minnesota, have invented certain new and useful Improvements in Cores; and I do hereby declare the following to be a full, clear, and exact description of the invention, such as will enable others skilled in the art to which it appertains to make and use the same.

My invention has for its object to improve the art of making molders' cores, and it comprises both a new product and a process of producing the same.

My improved cores are made from sand and glue, used approximately in the proportion of one part of glue to twenty-five of sand.

The process of producing these improved cores is as follows: Dry sand is heated and the glue, while hot and in liquid form, is mixed with this dry and hot sand. The glue should be in such an amount, that it will be entirely taken up and held by the sand, and they should be so well commingled that there will be no dripping of the glue, and each particle of sand will be covered with glue. The sand thus treated is allowed to cool, and as it cools, there being no moisture present, the grains of sand covered with the glue will separate and maintain granular form. When the cores are to be formed from this glue treated sand, water is mixed therewith, or the material is otherwise moistened, so that it will form an adhesive pliable mass capable of being molded into any desired form. The properly formed core is then baked until it is hard.

The cores constructed as above described, when subject to the intense heat of molten metal poured around the same, will become very brittle, so that by very slight agitation, they will return to granular form, and hence, may be rattled out of casings through the usual openings provided therefor. A core thus constructed however, when subjected to the hot metal, will produce but very little, if any, gas, and hence, vents such as usually found necessary, are not required. Furthermore, cores may be very quickly and rapidly made in accordance with my improved process.

What I claim is:

1. As a material for making cores, commingled sand and glue in granular form.

2. The process of making cores, which consists; first, in commingling sand and glue; second, in moistening the sand and glue and in forming the core out of this commingled sand and glue; and third, in baking the core.

3. The process of producing cores, which consists; first, in commingling dry hot sand with hot liquid glue, and then drying the material to reduce the same to granular form; second, in moistening this glue coated sand and giving the same the desired form; and third, in baking the core thus formed.

In testimony whereof I affix my signature in presence of two witnesses.

JOHNN WITTLIFF.

Witnesses:
H. D. KILGORE,
ALICE J. SWANSON.